Sept. 5, 1944. F. L. FULKE Re. 22,541

CUTTER BIT AND HOLDER THEREFOR

Original Filed June 13, 1938

INVENTOR.

Frank L. Fulke

BY

Hood & Hahn.

ATTORNEYS.

Reissued Sept. 5, 1944

Re. 22,541

UNITED STATES PATENT OFFICE 22,541

CUTTER BIT AND HOLDER THEREFOR

Frank L. Fulke, Terre Haute, Ind., assignor to Frank Prox Company, Inc., Terre Haute, Ind., a corporation of Indiana Original No. 2,296,235, dated September 15, 1942, Serial No. 213,423, June 13, 1938. Application for reissue November 2, 1942, Serial No. 464,239

13 Claims. (Cl. 262—33)

The object of the present invention is to provide an improved cutter bit with bit holding means for supporting the same in a mining machine chain block. It is an object of the invention to provide such means of such character that it may be used in a chain bit block originally designed to accommodate a conventional mine bit; so that, as the conditions encountered may indicate, either my improved bit or a conventional mine bit may be used in the same bit block.

Other objects of the invention will appear as the description proceeds.

To the accomplishment of the above and related objects, my invention may be embodied in the forms illustrated in the accompanying drawing, attention being called to the fact, however, that the drawing is illustrative only, and that change may be made in the specific constructions illustrated and described, so long as the scope of the appended claims is not violated.

Figure 1:
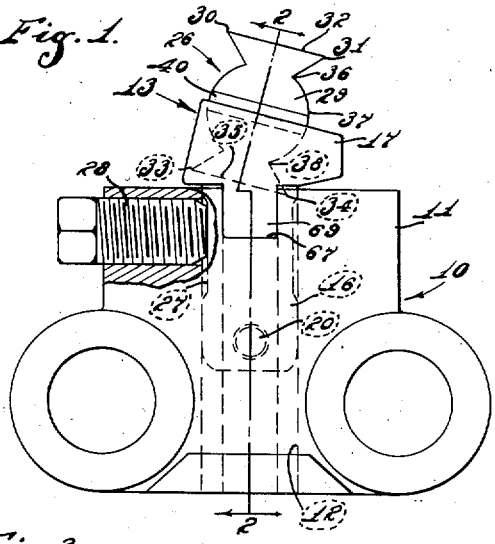
Fig. 1 is a plan view of a conventional bit block having associated therewith one form of bit and holder constructed in accordance with the present invention, parts being broken away for clarity of illustration.

Referring more particularly to the drawing, and specifically to Figs. 1 to 5 thereof, it will be seen that I have illustrated a conventional mining machine bit block indicated generally by the reference numeral 10 and formed to provide a head 11. A socket 12 is formed in said block, extending entirely through the same from the outermost surface of the head 11. This socket 12 is the conventional mining machine chain bit block socket of the type illustrated, for instance, in Fig. 6 of my Patent No. 2,168,794, issued August 8, 1939.

Received in said socket 12 is a bit holder or clamping means indicated generally by the reference numeral 13. As is clearly shown in Fig. 2, said bit holder 13 comprises two elements, indicated generally by the reference numerals 14 and 15 in Fig. 2, cooperating to form a shank and a head, the shank being receivable in the socket 12 and the head being formed to provide a bit holding recess. In the particular form of the invention illustrated herein, the shank of the bit holder 13 is formed by the cooperation of shanks 16 and 18 formed, respectively, upon the elements 14 and 15; and the head is formed by the cooperation of head portions 17 and 19 of said elements 14 and 15. If desired, one of the shanks, for instance, 16 may be formed with a swivel 20 received in a hole 21 in the other shank, for instance, 18. In the illustrated embodiment of the invention, the bit-receiving recess is formed partially as at 22 in the element 14 and partially as at 23 in the element 15. It is to be noted that the mouth of the bit-receiving recess is formed by outwardly beveled surfaces 24 and 25 upon the respective elements 14 and 15, and that said elements retreat sharply from the outer edges of said beveled portions, for a reason later to be explained.

Figure 2:
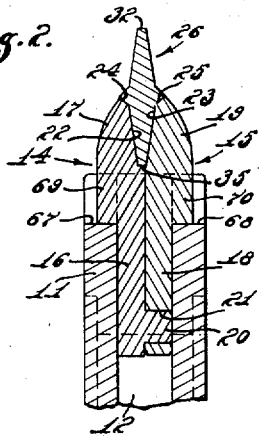
Fig. 2 is a transverse section taken substantially on the line 2—2 of Fig. 1 and looking in the direction of the arrows.
Figure 3:
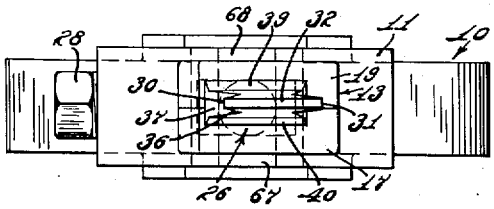
Fig. 3 is an elevation of the organization of Fig. 1.

In Figs. 1 to 3 inclusive, I have illustrated one particular form of bit received in the holder 13, said bit being indicated generally by the reference numeral 26. Obviously, the bit-receiving recess formed by the cooperation of the recesses 22 and 23 will conform in contour to the shape of that portion of the bit which is received therein.

Preferably, the shank elements 16 and 18 will be slightly reduced, as at 27, adjacent the point of engagement thereof by the conventional set screw 28, in order to reduce the possibility of loss in case of loosening of said set screw.

The bit 26 comprises a body portion 29 formed to provide cutting points 30 and 31 joined by a straight edge 32; and cutting points 33 and 34 joined by a straight edge 35. The cutting points 30 and 33 and the cutting points 31 and 34 are joined by edges of identical contour; and, in the embodiment of Figs. 1 to 3, that contour comprises a sharply reentrant angle 36 merging, through a part circular surface 37, with a sharply reentrant angle 38.

As is clearly to be seen from a consideration of Fig. 2, the projecting portion of the bit and the portion of the bit received within the recess of the holder 13 are identical thin wedges, in transverse section; but adjacent the portion of the bit body midway between the edges 32 and 35, there are formed identical, laterally projecting ribs 39 and 40. The ribs 39 and 40 closely overlie, respectively, the beveled surfaces 25 and 24 of the elements 15 and 14; thereby protecting the holder 13 very materially against abrasion during operation of the mining machine.

In order to guard against breakage of my holding means 13, I form in the block head 11 a transverse socket, intersecting the socket 12 substantially midway between its leading and trailing ends. In effect, this transverse socket comprises two grooves 67 and 68 in which are received depending shoulders 69 and 70 on the elements 14 and 15, respectively.

Figure 4:
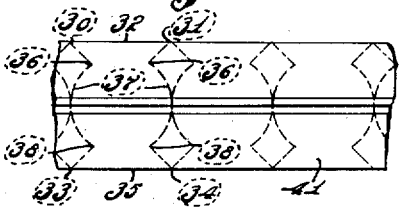
Fig. 4 is a diagrammatic illustration of the manner in which my improved bits of the type illustrated in Figs. 1 to 3 may be punched from bar stock of proper cross section.

A bit of the type illustrated in Figs. 1, 2, and 3 may be inexpensively produced by punching from bar stock, such as that illustrated at 41 in Fig. 4, the punching being performed on the dotted lines of said figure. It will be readily apparent, from a consideration of that figure, that very little stock is wasted in this operation, and that the bits may be rapidly and inexpensively produced.

Figure 6:
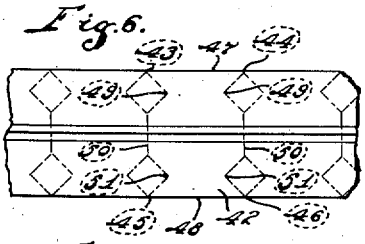
Fig. 6 is a fragmentary diagrammatic view illustrating the manner in which another form of bit included in my invention may be produced.

In Fig. 6 I have illustrated a bar 42, identical with the bar 41, and from which may be punched bits of slightly different contour by punching on the dotted lines of Fig. 6. Such bits will be formed with cutting points 43, 44, 45, and 46 defining a rectangle, just as do the cutting points 30, 31, 33, and 34 of Fig. 1. The points 43 and 44 will be joined by a straight edge 47, while the points 45 and 46 will be joined by a straight edge 48. The points 43 and 45 and the points 44 and 46 will be joined by edges of identical contour, each of said edges comprising a sharply reentrant angle 49, angularly merging with a straight edge 50 which, in turn, angularly merges with a second sharply reentrant angle 51. It will be seen that the bit of Fig. 6 is closely similar in contour to the bit of Fig. 4.

Figure 7:
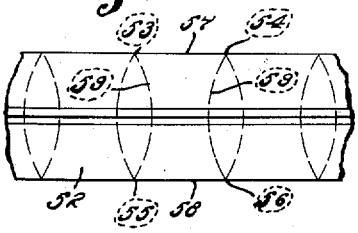
Fig. 7 is a fragmentary diagrammatic view illustrating the manner in which still another form of my improved bit may be produced.

According to Fig. 7, a slightly greater change from the contour of the bit of Fig. 4 is noted. The bar 52 is punched along the dotted lines illustrated in Fig. 7 to form bits each of which comprises four cutting points 53, 54, 55, and 56 defining a rectangle. The points 53 and 54 are joined by a straight line 57 and the points 55 and 56 are joined by a straight line 58. The points 53 and 55 and the points 54 and 56 are joined by identical smooth concave curved edges 59.

Figure 5:
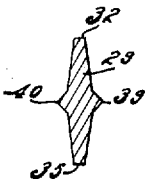
Fig. 5 is a transverse section of the bar stock illustrated in Figs. 4, 6, 7, and 8.
Figure 8:
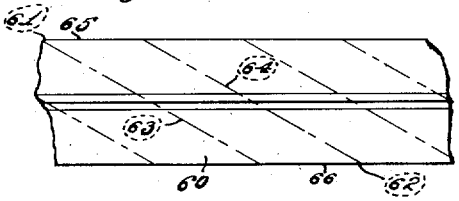
Fig. 8 is a fragmentary diagrammatic view illustrating the manner in which a fourth form of bit may be produced.

In Fig. 8 I have illustrated a manner in which still a further form of bit may be formed from bar stock 60 of the cross section illustrated in Fig. 5. By punching or sawing on the dotted lines of Fig. 8, bits of rhomboidal longitudinal section may be formed. Each of those bits will be formed with two cutting points 61 and 62 forming the termini of straight edges 65 and 66, respectively. The opposite termini of said straight edges will be joined, respectively, with the cutting points by plane surfaces 63 and 64.

In commercial practice heretofore, plural pointed bits for use in mining machines have customarily been formed either by drop forging or by sawing across a bar of desired cross section. So far as I am advised, such bars heretofore used have always been either substantially rhomboidal or substantially circular in cross section. Almost any desired shape and number of points may be produced by the drop forging method; but that method is expensive in view of die cost, waste of metal, thick flash produced, and the like. When the sawing method is used, the bit shape is strictly limited to one which may be secured by sawing a straight line across the selected bar stock; and the cost of such cutting, whether with hack saws or with abrasive wheels, is excessive.

By the punching method of the present application, on the other hand, a bit having four cutting points, and having great strength, may be produced at low cost with exceedingly little waste of metal.

My selection of bar stock from which my bits are produced, I consider to be an important feature of the present invention. The bits produced from such stock are much thinner than bits heretofore used, so far as I am advised; thereby permitting deep penetration of a coal seam with the formation of relatively little dust. The ribs 39 and 40 eventually contact the coal and break it loose after the preliminary cut has been made, thus securing relatively coarse cuttings. In addition, the ribs stiffen and strengthen the bit and perform the important function of protecting the relatively soft holder elements against abrasion and against breakage which might occur if the holder elements should contact hard cores.

As will be apparent from a consideration of the drawing, in each of the bit forms disclosed, the length of surface extending from each edge of the bit to the adjacent parallel root of the lateral rib is at least twice the length of the surface extending from said root to the apex of said rib; and is at least twice the greatest thickness of the bit, viz., the distance between the apex of one rib and the apex of the opposite rib.

I claim as my invention:

1. In combination, a mining machine chain bit symmetrical with respect to a median line and formed to provide a plurality of selectively usable cutting points, clamping means for holding said bit with one of its points directed in the line of travel of the chain, and at least one rib formed on said bit and projecting therefrom in a direction generally transverse to the line of chain travel, said rib being wholly disposed outside said clamping means and closely overlying the latter.

2. The combination with a mining machine chain bit block, of bit-holding means carried by said block and projecting beyond the outermost surface thereof, and a hardened plural pointed bit carried by said bit-holding means and projecting beyond the outermost surface thereof, the major part of the projecting portion of said bit being thinly wedge-shaped in cross section and a minor part of said sharply projecting portion being formed to provide lateral ribs disposed immediately beyond the outermost portion of said bit-holding means and overlying the latter to protect the same against abrasion.

3. In combination with a mining machine chain bit block, bit clamping means carried by said block and projecting beyond the outer surface thereof, a hardened bit carried by said clamping means and projecting beyond the outermost surface thereof, the projecting portion of said bit being thinly wedge shaped in cross section from its outer end to a point adjacent the outermost portion of said clamping means, and being bluntly wedge shaped in cross section immediately adjacent said clamping means, the bluntly wedge shaped portion of said bit closely overlying the outermost surface of said clamping means to protect the same against abrasion and to deliver wedging blows to coal adjacent the kerf cut by said thinly wedge shaped portion.

4. A mining machine chain bit comprising a piece of hardened metal symmetrical with respect to a median line, each of the portions of said bit on opposite sides of such median line defining a cutting face which is long and thinly wedge shaped and flaring from its extremity to the region of said median line and short and bluntly wedge shaped therefrom to said median line.

5. In combination with a mining machine chain bit block, bit clamping means carried by said block and projecting beyond the outer surface thereof, a hardened bit symmetrical with respect to a median line and carried by said clamping means and projecting beyond the outermost surface thereof, the projecting portion of said bit being thinly wedge shaped in cross section from its outer end to a point adjacent the outermost portion of said clamping means, and being bluntly wedge shaped in cross section immediately adjacent said clamping means, said clamping means embracing and enclosing all of one thinly wedge shaped portion of said bit and both bluntly wedge shaped portions of said bit being positioned outside said clamping means and closely overlying the outermost surface of said clamping means to protect the same against abrasion and to deliver wedging blows to coal adjacent the kerf cut by said thinly wedge shaped portion.

6. In a mining machine cutter chain including a socketed bit block, the combination with a cutter bit comprising an element having four cutting points lying substantially in the corners of an elongated rectangle having a major median line and a minor median line, said bit being symmetrical with respect to both of said median lines, and each of the portions of said bit lying on opposite sides of said minor median line being formed to provide two oppositely facing cutting points, of a holder for said bit comprising a shank receivable in the socket of said block and a head disposed outside said block socket and embracing and enclosing all of one only of said portions.

7. The combination with a mining machine chain including a bit block formed with a socket, of a cutter bit comprising a small piece of steel formed to provide two pairs of oppositely presented cutting points, said bit being symmetrical with respect to a line midway between said pairs of points, and the distance between the points of each pair being less than the distance between corresponding points of the respective pairs, and a holder comprising a shank receivable in said block socket and a head disposed outside said socket and formed to receive all of that portion of said bit lying on either side of said line to support said bit against shocks applied in any direction.

8. In a mining chain, a bit block having a socket adapted to receive therein a bit holder shank, said socket being enlarged in its lateral dimensions near its upper end by a transverse slot of lesser dimension in a front to rear direction than that of the lower portion of said socket, and said holder being provided with a shoulder snugly received in said slot.

9. In a mining chain link, a socket, a bit holder having a shank adapted to be received in the socket and a head adapted to support a bit, and lateral extensions on said head of lesser front to rear dimension than that of the shank, said extensions occupying a transverse slot adjacent the upper end of the socket.

10. In a mining chain a bit block having a socket adapted to receive therein a bit holder shank, means laterally extending from the holder cooperating with a transverse opening at the mouth of said socket for gaining strength, and said means and said transverse opening both being of lesser dimension than the front to rear dimension of the socket.

11. In a mining chain a link formed with a socket of rectangular section adapted to receive a conventional mine bit, a bit holder having a shank extending into said socket and bit clamping portions extended outwardly therefrom, a four pointed bit clamped between elements of said bit holder with the major part of said bit located outwardly beyond said link, and at least one half of said bit body being located outwardly beyond said bit holder, said bit having its major axis outwardly and rearwardly inclined, and a screw engaging said holder shank.

12. A mining machine bit formed, on either side of a median plane, with a cutting face presenting a long thinly wedge shaped section flaring from its outer end to a point adjacent said median plane and a short bluntly wedge shaped section merging, in said median plane, with the corresponding bluntly wedge shaped section on the other side of said median plane, the angles between the flaring boundaries of said thinly wedge shaped portions being bisected by a common line perpendicular to said median plane.

13. A bit for mining machines, comprising a solid piece of metal rhomboidal in side elevation and having substantially parallel cutting faces, said cutting faces being offset relative to each other and forming cutting points at diametrically opposed sharper angles of the rhomboid, each cutting face having a long, narrow outer portion and a substantially wider base and being defined by two side edges, which lie within and inwardly spaced from two converging imaginary lines which intersect beyond said point and each of which contacts a side edge at said base and adjacent said point, said side edges being symmetrical about the major axis of said bit face, the angle of departure of each of said edges from said axis adjacent said bit point being substantially less than the angle of departure of each of said edges from said axis adjacent said base, said outer portion being adapted to cut deeply and narrowly into a coal vein, and said base portion being adapted to wedge or break away coal ridges left standing between kerfs cut by adjacent bits on a chain.

FRANK L. FULKE.